US012730458B2

(12) United States Patent
Matsunaga et al.

(10) Patent No.: US 12,730,458 B2
(45) Date of Patent: Sep. 8, 2026

(54) MOBILE OBJECT CONTROL DEVICE, MOBILE OBJECT CONTROL METHOD, AND STORAGE MEDIUM

(71) Applicant: HONDA MOTOR CO., LTD., Minato-ku (JP)

(72) Inventors: Hideki Matsunaga, Wako (JP); Takashi Matsumoto, Wako (JP); Ryoji Wakayama, Wako (JP); Koki Aizawa, Wako (JP); Kento Shirakata, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 18/850,584

(22) PCT Filed: Mar. 31, 2022

(86) PCT No.: PCT/JP2022/016482
§ 371 (c)(1),
(2) Date: Sep. 25, 2024

(87) PCT Pub. No.: WO2023/188251
PCT Pub. Date: Oct. 5, 2023

(65) Prior Publication Data
US 2025/0216865 A1 Jul. 3, 2025

(51) Int. Cl.
*G08G 1/00* (2006.01)
*B60W 30/14* (2006.01)
(Continued)

(52) U.S. Cl.
CPC ............. *G05D 1/65* (2024.01); *B60W 30/146* (2013.01); *G06V 10/761* (2022.01); *G06V 20/58* (2022.01);
(Continued)

(58) Field of Classification Search
CPC .... G06V 20/58; G06V 20/588; G06V 10/764; G08G 1/0116; G08G 1/0125;
(Continued)

(56) References Cited

U.S. PATENT DOCUMENTS

2014/0355879 A1* 12/2014 Agosta .................... G06T 7/143 382/199
2020/0074266 A1* 3/2020 Peake ................. G06F 18/2411
(Continued)

FOREIGN PATENT DOCUMENTS

JP 2017-100490 6/2017
JP 2020-086995 6/2020
(Continued)

OTHER PUBLICATIONS

European Search Report for European Patent Application No. 22935396.6 mailed Apr. 9, 2025.
(Continued)

*Primary Examiner* — Dalena Tran
(74) *Attorney, Agent, or Firm* — Amin, Turocy & Watson, LLP

(57) ABSTRACT

A mobile object control device for controlling a mobile object capable of moving both on a roadway and in a predetermined region different from the roadway includes a road type recognition unit configured to set a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object and recognize whether the mobile object is moving on the roadway or in the predetermined region on the basis of results of perform-
(Continued)

ing spatial classification processes for the virtual central lane, the virtual right lane, and the virtual left lane and a control unit configured to limit a speed of a case where the mobile object moves on the roadway to a first speed and limit a speed of a case where the mobile object moves in the predetermined region to a second speed lower than the first speed.

12 Claims, 8 Drawing Sheets

(51) Int. Cl.

| | |
|---|---|
| ***G05D 1/65*** | (2024.01) |
| ***G06V 10/74*** | (2022.01) |
| ***G06V 20/56*** | (2022.01) |
| ***G06V 20/58*** | (2022.01) |
| *G05D 105/22* | (2024.01) |
| *G05D 105/28* | (2024.01) |
| *G05D 107/13* | (2024.01) |
| *G05D 107/17* | (2024.01) |

(52) U.S. Cl.

CPC ..... *G06V 20/588* (2022.01); *B60W 2420/403* (2013.01); *B60W 2552/05* (2020.02); *B60W 2720/10* (2013.01); *G05D 2105/22* (2024.01); *G05D 2105/28* (2024.01); *G05D 2107/13* (2024.01); *G05D 2107/17* (2024.01)

(58) Field of Classification Search

CPC ........ G08G 1/123; G08G 1/166; G08G 1/207; B60W 2552/05; B60W 30/146; B60W 40/04

See application file for complete search history.

(56) References Cited

U.S. PATENT DOCUMENTS

2020/0076878 A1* 3/2020 Whited .................. G06F 16/29
2020/0250975 A1 8/2020 Tang et al.
2023/0140569 A1* 5/2023 Foster ................ B60W 30/146 701/400

FOREIGN PATENT DOCUMENTS

JP 2021-149951 9/2021
WO 2020/212808 10/2020

OTHER PUBLICATIONS

International Search Report and Written Opinion for International Application No. PCT/JP2022/016482 mailed on Jun. 21, 2022, 8 pages.

* cited by examiner

| | VIRTUAL LEFT LANE IMAGE | VIRTUAL CENTRAL LANE IMAGE (RELIABILITY DEGREE:LOW) | VIRTUAL RIGHT LANE IMAGE | RESULT OF RECOGNIZING VIRTUAL CENTRAL LANE |
|---|---|---|---|---|
| (1) | ROADWAY | - | ROADWAY | ROADWAY |
| (2) | PREDETERMINED REGION | - | PREDETERMINED REGION | PREDETERMINED REGION |
| (3) | PREDETERMINED REGION | $\alpha l > Th2$ and $\alpha l - \alpha r > Th3$ | ROADWAY | PREDETERMINED REGION |
| (4) | PREDETERMINED REGION | $\alpha r > Th2$ and $\alpha r - \alpha l > Th3$ | ROADWAY | ROADWAY |
| (5) | PREDETERMINED REGION | $\alpha l \leqq Th4$ and $\alpha r \leqq Th4$ | ROADWAY | UNCLEAR |
| (6) | REGION OTHER THAN COURSE | PARTITION BETWEEN CENTER AND RIGHT | ROADWAY | PREDETERMINED REGION |
| (7) | REGION OTHER THAN COURSE | $\alpha r \leqq Th4$ | ROADWAY | PREDETERMINED REGION |
| (8) | REGION OTHER THAN COURSE | $\alpha r > Th4$ | ROADWAY | ROADWAY |

Figure 8:
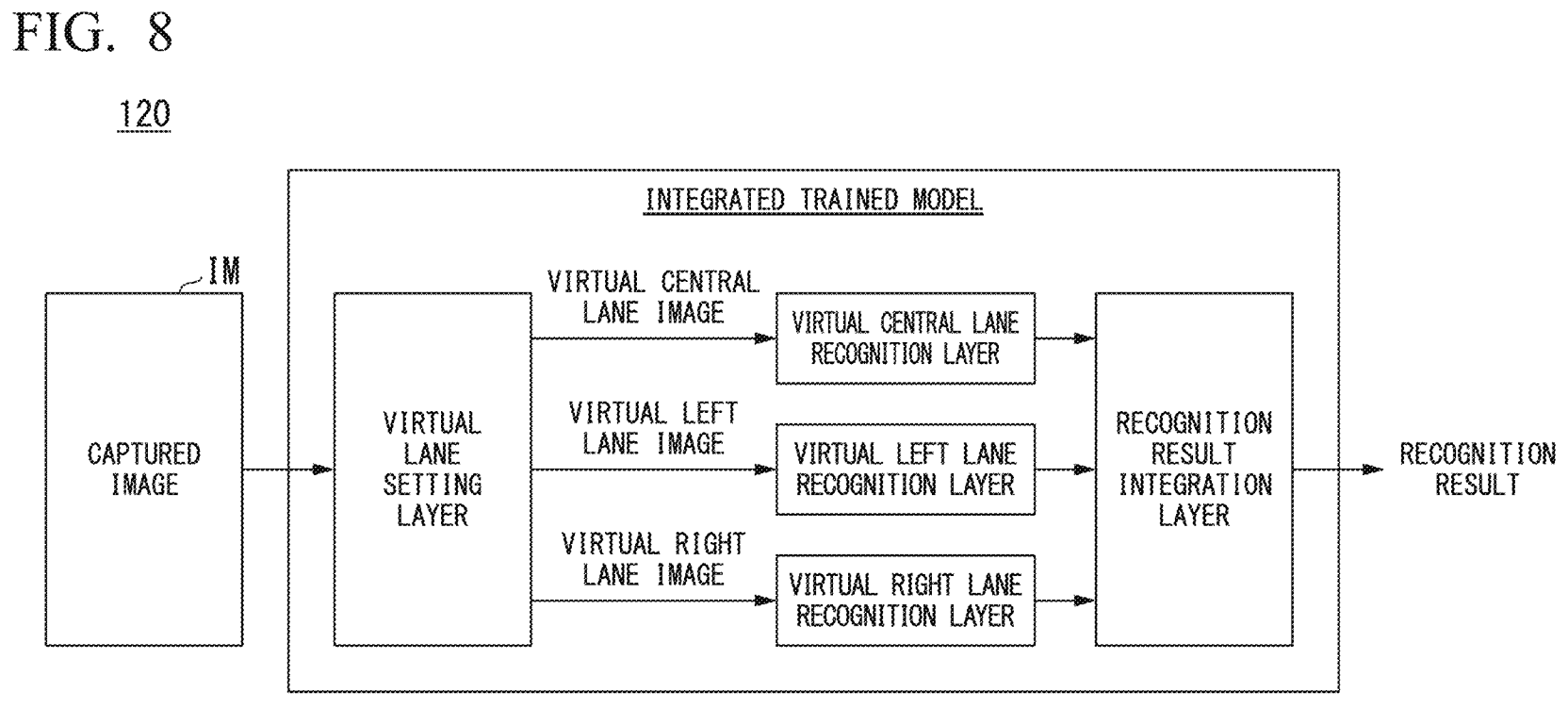

CAPTURED IMAGE

IM

INTEGRATED TRAINED MODEL

VIRTUAL LANE SETTING LAYER

VIRTUAL CENTRAL LANE IMAGE

VIRTUAL LEFT LANE IMAGE

VIRTUAL RIGHT LANE IMAGE

VIRTUAL CENTRAL LANE RECOGNITION LAYER

VIRTUAL LEFT LANE RECOGNITION LAYER

VIRTUAL RIGHT LANE RECOGNITION LAYER

RECOGNITION RESULT INTEGRATION LAYER

RECOGNITION RESULT

MOBILE OBJECT CONTROL DEVICE, MOBILE OBJECT CONTROL METHOD, AND STORAGE MEDIUM

TECHNICAL FIELD

The present invention relates to a mobile object control device, a mobile object control method, and a storage medium.

BACKGROUND ART

Conventionally, practical applications have been made for mobile objects capable of moving on both a sidewalk and a roadway and it is necessary to set different upper limit speeds for the sidewalk and the roadway for such mobile objects. In this regard, documents considering a process of recognizing whether a mobile object is moving on a sidewalk or a roadway have been disclosed (Patent Document 1).

CITATION LIST

Patent Document

Patent Document 1

Japanese Unexamined Patent Application, First Publication No. 2020-086995

SUMMARY OF INVENTION

Technical Problem

In the conventional technology, it may not be possible to appropriately recognize whether a mobile object is moving on a roadway or in a predetermined region different from the roadway.

The present invention has been made in consideration of such circumstances and an objective of the present invention is to provide a mobile object control device, a mobile object control method, and a storage medium for enabling whether a mobile object is moving on a roadway or in a predetermined region different from the roadway to be appropriately recognized.

Solution to Problem

A mobile object control device, a mobile object control method, and a storage medium according to the present invention adopt the following configurations.

(1): According to an aspect of the present invention, there is provided a mobile object control device for controlling a mobile object capable of moving both on a roadway and in a predetermined region different from the roadway, the mobile object control device including: a road type recognition unit configured to set a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object and recognize whether the mobile object is moving on the roadway or in the predetermined region on the basis of results of performing spatial classification processes for the virtual central lane, the virtual right lane, and the virtual left lane; and a control unit configured to limit a speed of a case where the mobile object moves on the roadway to a first speed and limit a speed of a case where the mobile object moves in the predetermined region to a second speed lower than the first speed.

(2): In the above-described aspect (1), the road type recognition unit recognizes whether the virtual central lane is a representation of the roadway or the predetermined region, recognizes whether the mobile object is moving on the roadway or in the predetermined region on the basis of a recognition result related to the virtual central lane when a reliability degree of the recognition result related to the virtual central lane is greater than or equal to a reference degree, and recognizes whether the mobile object is moving on the roadway or in the predetermined region on the basis of results of performing spatial classification processes for the virtual left lane and the virtual right lane when the reliability degree of the recognition result related to the virtual central lane is less than or equal to the reference degree.

(3): In the above-described aspect (1) or (2), the road type recognition unit recognizes whether each of the virtual left lane and the virtual right lane is a representation of the roadway, the predetermined region, or a region other than the course as the spatial classification process.

(4): In the above-described aspect (3), the road type recognition unit recognizes whether the mobile object is moving on the roadway or in the predetermined region on the basis of a combination of results of performing spatial classification processes for the virtual left lane and the virtual right lane.

(5): In the above-described aspect (3), the road type recognition unit recognizes whether the mobile object is moving on the roadway or in the predetermined region on the basis of a similarity degree between an image related to the virtual left lane and an image related to the virtual central lane and a similarity degree between an image related to the virtual right lane and the image related to the virtual central lane when recognizing that one of the virtual left lane and the virtual right lane is the representation of the roadway and the other is the representation of the predetermined region.

(6): In the above-described aspect (3), the road type recognition unit recognizes whether the mobile object is moving on the roadway or in the predetermined region on the basis of a similarity degree between an image related to the virtual left lane and an image related to the virtual central lane, a similarity degree between an image related to the virtual right lane and the image related to the virtual central lane, and whether or not there is a partition in a boundary portion between the image related to the virtual central lane and an image recognized as the representation of the roadway when recognizing that one of the virtual left lane and the virtual right lane is the representation of the region other than the course and the other is the representation of the roadway.

(7): In the above-described aspect (1), the road type recognition unit obtains a result of recognizing whether the mobile object is moving on the roadway or in the predetermined region by inputting information, which is obtained by adding virtual lane designation information indicating which region corresponds to which virtual lane to the captured image, to a trained model.

(8): In the above-described aspect (1), the road type recognition unit obtains a result of recognizing whether the mobile object is moving on the roadway or in the predetermined region by inputting the captured image to a trained model.

(9): In the above-described aspect (7) or (8), the trained model is a trained model in which a parameter of a layer for performing a spatial classification process for each virtual lane and a parameter of a layer for integrating results of spatial classification processes for virtual lanes are simultaneously learned in a backpropagation process using common learning data and training data.

(10): In the above-described aspect (1), the road type recognition unit designates a series of edges as a boundary between two virtual lanes adjacent to each other among a plurality of virtual lanes when the series of edges indicating a course boundary in the captured image can be extracted.

(11): In the above-described aspect (10), the road type recognition unit sets a boundary between two virtual lanes adjacent to each other among a plurality of virtual lanes by assuming that at least some of the plurality of virtual lanes are extended by a specified width on a road surface with respect to a region where the series of edges cannot be extracted in the captured image.

(12): In the above-described aspect (1), the road type recognition unit performs an iterative process at a predetermined cycle and recognizes whether the mobile object is moving on the roadway or in the predetermined region by taking over previous recognition results for a plurality of virtual lanes.

(13): According to another aspect of the present invention, there is provided a mobile object control method to be performed by a mobile object control device for controlling a mobile object capable of moving both on a roadway and in a predetermined region different from the roadway, the mobile object control method including: setting a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object; recognizing whether the mobile object is moving on the roadway or in the predetermined region on the basis of results of performing spatial classification processes for the virtual central lane, the virtual right lane, and the virtual left lane; and limiting a speed of a case where the mobile object moves on the roadway to a first speed and limiting a speed of a case where the mobile object moves in the predetermined region to a second speed lower than the first speed.

(14): According to yet another aspect of the present invention, there is provided a storage medium storing a program for causing a processor of a mobile object control device for controlling a mobile object capable of moving both on a roadway and in a predetermined region different from the roadway to: set a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object; recognize whether the mobile object is moving on the roadway or in the predetermined region on the basis of results of performing spatial classification processes for the virtual central lane, the virtual right lane, and the virtual left lane; and limit a speed of a case where the mobile object moves on the roadway to a first speed and limit a speed of a case where the mobile object moves in the predetermined region to a second speed lower than the first speed.

Advantageous Effects of Invention

According to the above-described aspects (1) to (14), it is possible to appropriately recognize whether a mobile object is moving on a roadway or in a predetermined region different from the roadway.

BRIEF DESCRIPTION OF DRAWINGS

FIG. 7 is an explanatory diagram (Part 2) showing a process of the road type recognition unit 120.

FIG. 8 is an explanatory diagram showing details of a process of a road type recognition unit 120 using an integrated trained model.

DESCRIPTION OF EMBODIMENTS

Hereinafter, embodiments of a mobile object control device, a mobile object control method, and a program according to the present invention will be described with reference to the drawings. A mobile object moves both on a roadway and in a predetermined region different from the roadway. The mobile object may be referred to as micromobility. An electric kickboard is a type of micromobility. Moreover, the mobile object may be a vehicle that an occupant can board or may be an autonomous mobile object capable of performing unmanned autonomous movement. The autonomous mobile object is used, for example, for an application to transport cargo or the like. The predetermined region is, for example, a sidewalk. Moreover, the predetermined region may be a part or all of a roadside strip, a bicycle lane, a public open space, or the like or may include all sidewalks, roadside strips, bicycle lanes, public open spaces, and the like. In the following description, it is assumed that the predetermined region includes a sidewalk and a public open space.

Figure 1:
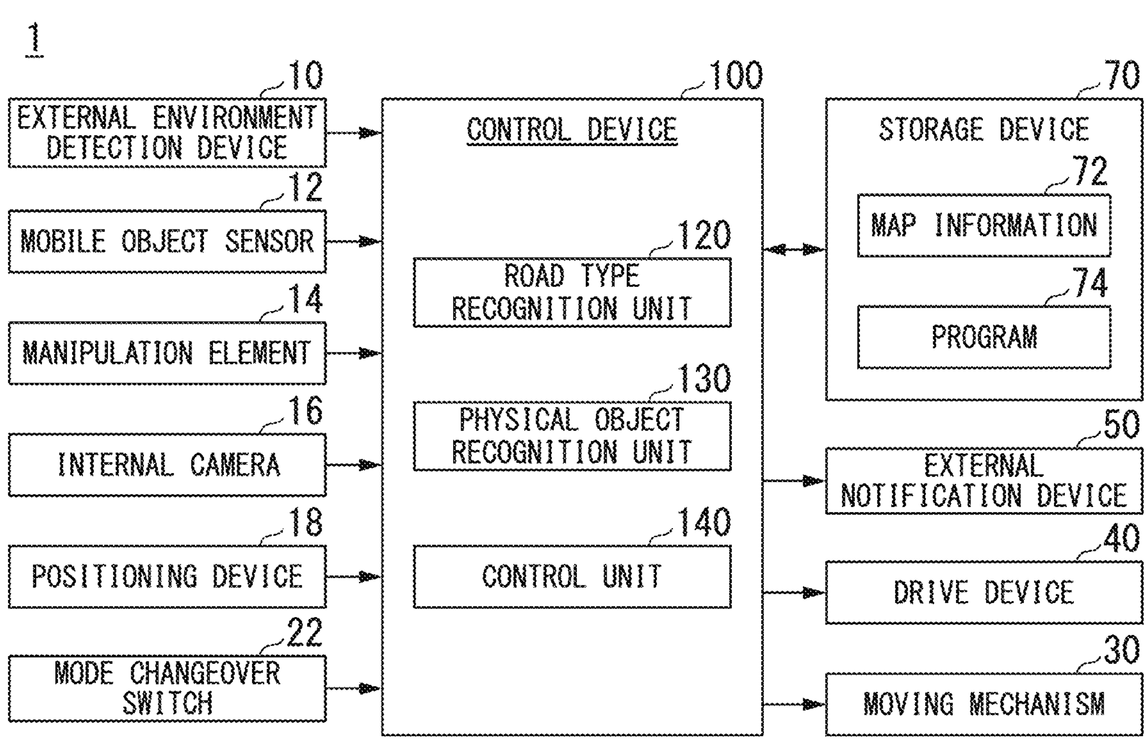
FIG. 1 is a diagram showing an example of a configuration of a mobile object and a control device according to an embodiment.

FIG. 1 is a diagram showing an example of a configuration of the mobile object and the control device 100 according to the embodiment. The mobile object 1 includes, for example, an external environment detection device 10, a mobile object sensor 12, a manipulation element 14, an internal camera 16, a positioning device 18, a mode changeover switch 22, a moving mechanism 30, a drive device 40, an external notification device 50, a storage device 70, and a control device 100. Also, some constituent elements not essential for implementing the functions of the present invention may be omitted. Mobile objects are not limited to vehicles and may include a small mobility for moving side by side with a walking user and carrying cargo or guiding a person and may include other mobile objects (for example, a walking robot and the like) that can move autonomously.

The external environment detection device 10 includes various types of devices in which a movement direction of the mobile object 1 is designated as a detection range. The external environment detection device 10 includes an external camera, a radar device, a light detection and ranging (LIDAR) sensor, a sensor fusion device, and the like. The external environment detection device 10 outputs information indicating a detection result (an image, a position of a physical object, or the like) to the control device 100.

The mobile object sensor 12 includes, for example, a speed sensor, an acceleration sensor, a yaw rate (angular velocity) sensor, an orientation sensor, a manipulation quantity detection sensor attached to the manipulation element 14, and the like. The manipulation element 14 includes, for example, a manipulation element for issuing an acceleration/deceleration instruction (for example, an accelerator pedal or a brake pedal) and a manipulation element for issuing a steering instruction (for example, a steering wheel). In this case, the mobile object sensor 12 may include an accelerator opening degree sensor, a brake depression amount sensor, a steering torque sensor, and the like. The mobile object 1 may include a type of manipulation element other than the above manipulation elements (for example, a non-annular rotation manipulation element, a joystick, a button, or the like) as the manipulation element 14.

The internal camera 16 images at least a head of the occupant of the mobile object 1 from the front. The internal camera 16 is a digital camera that uses an imaging element such as a charge-coupled device (CCD) or a complementary metal oxide semiconductor (CMOS). The internal camera 16 outputs a captured image to the control device 100.

The positioning device 18 is a device for measuring a position of the mobile object 1. The positioning device 18 is, for example, a global navigation satellite system (GNSS) receiver, and identifies the position of the mobile object 1 on the basis of a signal received from a GNSS satellite and outputs the identified position as position information. Also, the position information of the mobile object 1 may be estimated from a position of a Wi-Fi base station to which a communication device to be described below is connected.

The mode changeover switch 22 is a switch to be manipulated by the occupant. The mode changeover switch 22 may be a mechanical switch or a graphical user interface (GUI) switch set on the touch panel. The mode changeover switch 22 receives a manipulation for switching a driving mode to any one of, for example, mode A that is an assist mode in which one of the steering manipulation and acceleration/deceleration control is performed by the occupant and the other is performed automatically and that may be mode A-1 in which the steering manipulation is performed by the occupant and the acceleration/deceleration control is performed automatically or mode A-2 in which an acceleration/deceleration manipulation is performed by the occupant and the steering control is performed automatically, mode B that is a manual driving mode in which the steering manipulation and the acceleration/deceleration manipulation are performed by the occupant, and mode C that is an automated driving mode in which the steering control and the acceleration/deceleration control are performed automatically.

The moving mechanism 30 is a mechanism for moving the mobile object 1 on the road. The moving mechanism 30 is, for example, a wheel group that includes a steered wheel and a driven wheel. Moreover, the moving mechanism 30 may be a leg unit for multi-legged walking.

The drive device 40 outputs a force to the moving mechanism 30 so that the mobile object 1 can be moved. For example, the drive device 40 includes a motor that drives the driven wheel, a battery that stores electric power to be supplied to the motor, a steering device that adjusts the steering angle of the steered wheel, and the like. The drive device 40 may include an internal combustion engine, a fuel cell, or the like as a driving force output means or an electric power generation means. Moreover, the drive device 40 may further include a braking device using a friction force or air resistance.

The external notification device 50 is, for example, a lamp, a display device, a speaker, or the like provided on an outer plate portion of the mobile object 1 and configured to provide a notification of information to the outside of the mobile object 1. The external notification device 50 performs different operations in a state in which the mobile object 1 is moving in a predetermined region and a state in which the mobile object 1 is moving on the roadway. For example, the external notification device 50 is controlled so that light of the lamp is emitted when the mobile object 1 is moving in the predetermined region and light of the lamp is not emitted when the mobile object 1 is moving on the roadway. The color of the light emitted by this lamp is preferably a color specified by law. The external notification device 50 may be controlled so that the light of the lamp is emitted in green when the mobile object 1 is moving in the predetermined region and the light of the lamp is emitted in blue when the mobile object 1 is moving on the roadway. When the external notification device 50 is a display device, the external notification device 50 displays text or a graphic indicating "moving on the sidewalk" when the mobile object 1 is moving in the predetermined region.

Figure 2:
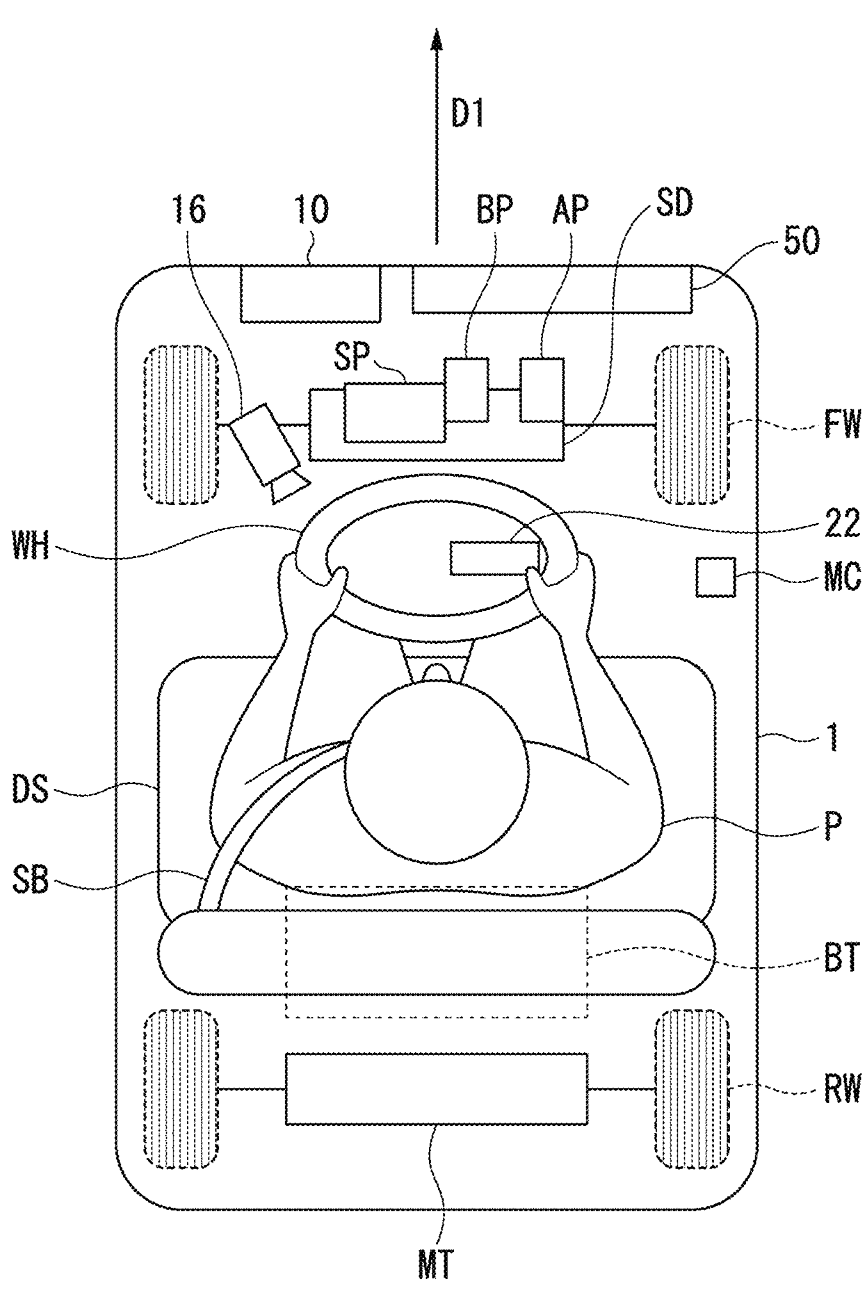
FIG. 2 is a perspective view of the mobile object viewed from above.

FIG. 2 is a perspective view of the mobile object 1 viewed from above. In FIG. 2, FW denotes the steered wheel, RW denotes the driven wheel, SD denotes the steering device, MT denotes the motor, and BT denotes the battery. The steering device SD, the motor MT, and the battery BT are included in the drive device 40. Moreover, AP denotes the accelerator pedal, BP denotes the brake pedal, WH denotes the steering wheel, SP denotes the speaker, and MC denotes a microphone. The mobile object 1 shown in FIG. 2 is a single-seater mobile object and an occupant P is seated in the driver's seat DS and wearing a seat belt SB. An arrow D1 indicates a movement direction (a speed vector) of the mobile object 1. The external environment detection device 10 is provided near a front end of the mobile object 1, the internal camera 16 is provided at a position where the head of the occupant P can be imaged from the front of the occupant P, and the mode changeover switch 22 is provided on a boss portion of the steering wheel WH. Moreover, the external notification device 50 serving as a display device is provided near the front end of the mobile object 1.

Returning to FIG. 1, the storage device 70 is, for example, a non-transitory storage device such as a hard disk drive (HDD), a flash memory, or a random-access memory (RAM). The storage device 70 stores map information 72, a program 74 to be executed by the control device 100, and the like. Although the storage device 70 is shown outside a frame of the control device 100 in FIG. 1, the storage device 70 may be included in the control device 100. Moreover, the storage device 70 may be provided on a server (not shown).

First Embodiment

[Control Device]

The control device 100 includes, for example, a road type recognition unit 120, a physical object recognition unit 130, and a control unit 140. These constituent elements are implemented, for example, by a hardware processor such as a central processing unit (CPU) executing a program (software) 74. Also, some or all of these constituent elements may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in the storage device 70 or may be stored in a removable storage medium (a non-transitory storage medium) such as a DVD or a CD-ROM and installed in the storage device 70 when the storage medium is mounted in a drive device.

The road type recognition unit 120 recognizes whether the mobile object 1 is moving on the roadway or in the predetermined region. For example, the road type recognition unit 120 recognizes whether the mobile object 1 is moving on the roadway or in the predetermined region by analyzing an image captured by the external camera of the external environment detection device 10. Also, the output of a radar device, a LIDAR sensor, a sensor fusion device, or the like may be used in an auxiliary way. Details of a process of the road type recognition unit 120 will be described below.

The physical object recognition unit 130 recognizes a physical object located near the mobile object 1 on the basis of an output of the external environment detection device 10. Physical objects include some or all of mobile objects such as a vehicle, a bicycle, and a pedestrian, course boundaries such as a road marking, a step, a guardrail, a road shoulder, a median strip, structures installed on the road such as a road sign and a signboard, and an obstacle such as a falling object located (having fallen) on the course. For example, the physical object recognition unit 130 acquires information such as the presence, position, and type of another mobile object when an image captured by the external camera of the external environment detection device 10 is input to a trained model that has been trained to output information such as the presence, position, and type of a physical object if the image captured by the external camera is input. A type of the other mobile object can also be estimated on the basis of a size in the image and/or the intensity of reflected waves received by the radar device of the external environment detection device 10. Moreover, the physical object recognition unit 130 acquires, for example, the speed of another mobile object detected by the radar device using a Doppler shift or the like.

The control unit 140 controls, for example, the drive device 40 in accordance with a set driving mode. Also, the mobile object 1 may execute only some of the following driving modes, but the control unit 140 sets different speed limit values when the mobile object 1 moves on the roadway and when the mobile object 1 moves in the predetermined region in any case. In this case, the mode changeover switch 22 may be omitted.

In mode A-1, the control unit 140 controls the motor MT of the drive device 40 so that a distance from a physical object located in front of the mobile object 1 is maintained at a certain distance or more when the mobile object 1 moves on the roadway and the mobile object 1 moves at a first speed V1 (e.g., a speed of 10 [km/h] or more and less than several tens of kilometers per hour [km/h]) when a distance from a physical object located in front of the mobile object 1 is sufficiently long with reference to information about a course and a physical object based on the output of the physical object recognition unit 130. The control unit 140 controls the motor MT of the drive device 40 so that a distance from a physical object located in front of the mobile object 1 is maintained at a certain distance or more when the mobile object 1 moves in the predetermined region and the mobile object 1 moves at the second speed V2 (for example, a speed of less than 10 [km/h]) when a distance from a physical object located in front of the mobile object 1 is sufficiently long. This function is similar to an adaptive cruise control (ACC) function of a vehicle in which the first speed V1 or the second speed V2 is designated as the set speed and the technology used in ACC can be used. Moreover, in mode A-1, the control unit 140 controls the steering device SD so that a steering angle of the steered wheel is changed on the basis of a manipulation quantity of the manipulation element 14 such as the steering wheel. This function is similar to that of a power steering device and the technology used in the power steering device can be used. Also, electronic control is not performed in relation to steering and the mobile object 1 may include a steering device in which the manipulation element 14 and the steering mechanism are mechanically connected.

In mode A-2, the control unit 140 controls the steering device SD of the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. In relation to acceleration/deceleration, the control unit 140 controls the motor MT of the drive device 40 on the basis of the speed of the mobile object 1 and the manipulation quantity of the accelerator pedal or the brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode A-2) when the mobile object 1 is moving on the roadway and controls the drive device 40 in a state in which the second speed V2 is designated as the upper limit speed when the mobile object 1 is moving in the predetermined region.

In mode B, the control unit 140 controls the motor MT of the drive device 40 on the basis of the speed of the mobile object 1 and the manipulation quantity of the accelerator pedal or brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode B) when the mobile object 1 is moving on the roadway and controls the motor MT of the drive device 40 in a state in which the second speed V2 is designated as the upper limit speed when the mobile object 1 is moving in the predetermined region. In relation to steering, mode B is similar to mode A-1.

In mode C, the control unit 140 controls the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. Even in mode C, the control unit 140 controls the drive device 40 in a state in which the first speed V1 is designated as the upper limit speed when the mobile object 1 is moving on the roadway and controls the drive device 40 in a state in which the second speed V2 is designated as the upper limit speed when the mobile object 1 is moving in the predetermined region.

[Road Type Recognition]

Hereinafter, a process of the road type recognition unit 120 will be described. The road type recognition unit 120 defines a plurality of virtual lanes including a virtual central lane including an assumed course of the mobile object 1, a virtual right lane located on the right side of the virtual central lane as seen from the mobile object 1, and a virtual left lane located on the left side of the virtual central lane as seen from the mobile object 1 in a space on a movement direction side of the mobile object 1 and recognizes whether the mobile object 1 is moving on a roadway or in a predetermined region on the basis of results of performing spatial classification processes on the basis of an output of the external environment detection device 10 for the plurality of virtual lanes.

Figure 3:
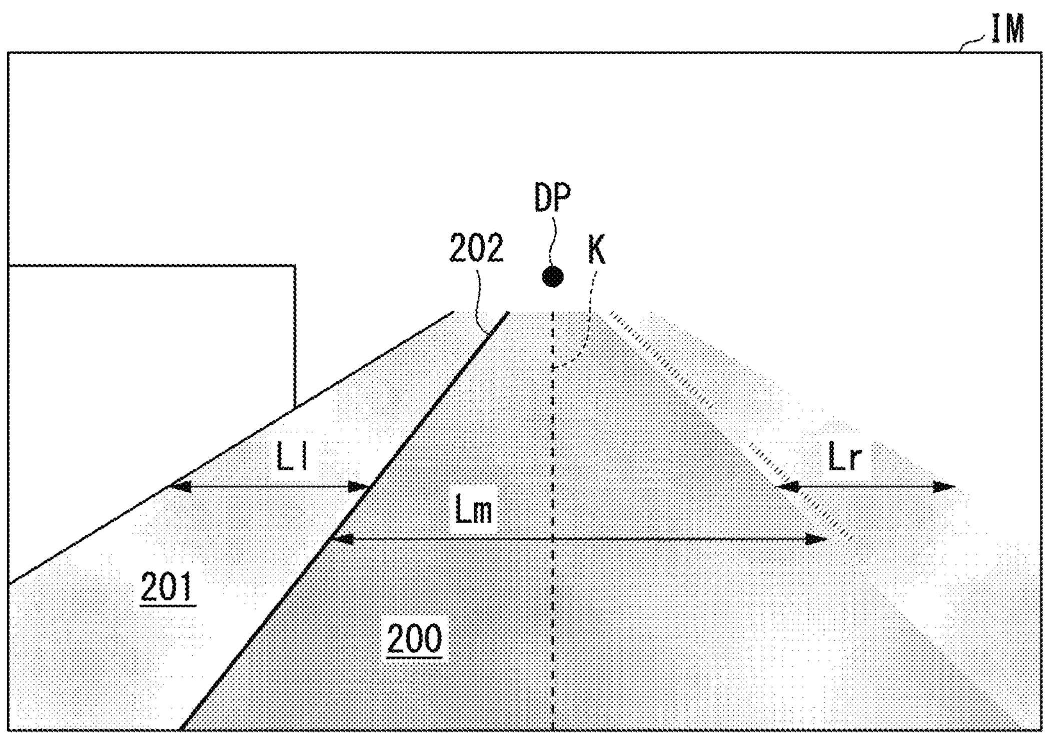
FIG. 3 is a diagram showing an example of a captured image IM of an external camera.

The external environment detection device 10 used by the road type recognition unit 120 is an external camera configured to image the outside of the mobile object. FIG. 3 is a diagram showing an example of a captured image IM of the external camera. In FIG. 3, reference sign 200 denotes a roadway and reference sign 201 denotes a sidewalk. A region Lm in FIG. 3 is a virtual central lane including an assumed course K of the mobile object 1 (e.g., wherein the virtual central lane may be located on an extension line of the central axis of the mobile object 1 at that time, but is not limited thereto; the virtual central lane may be a future course corresponding to a steering angle when a steering angle is generated). A region Lr in FIG. 3 is a virtual right lane Lr located on the right side of the virtual central lane Lm and a region L1 is a virtual left lane located on the left side of the virtual central lane Lm as seen from the mobile object 1.

The road type recognition unit 120 sets the virtual central lane Lm, the virtual right lane Lr, and the virtual left lane L1 on the captured image IM, and performs a process for each region in the captured image IM. When this region is defined, if a series of edges indicating the course boundary (hereinafter referred to as course boundary edges) can be extracted by the road type recognition unit 120 in the captured image IM, the course boundary edges are designated as a boundary between two virtual lanes adjacent to each other among the plurality of virtual lanes. An edge is pixels (feature pixels) in which a difference between pixel values (luminance values, RGB values, and the like) from adjacent pixels is larger than a reference value. Although there are various methods of selecting adjacent pixels, when a line extending in a movement direction as seen from the mobile object 1 is extracted, it is preferable to select a pixel in a horizontal direction from a pixel of attention as an adjacent pixel.

Figure 4:
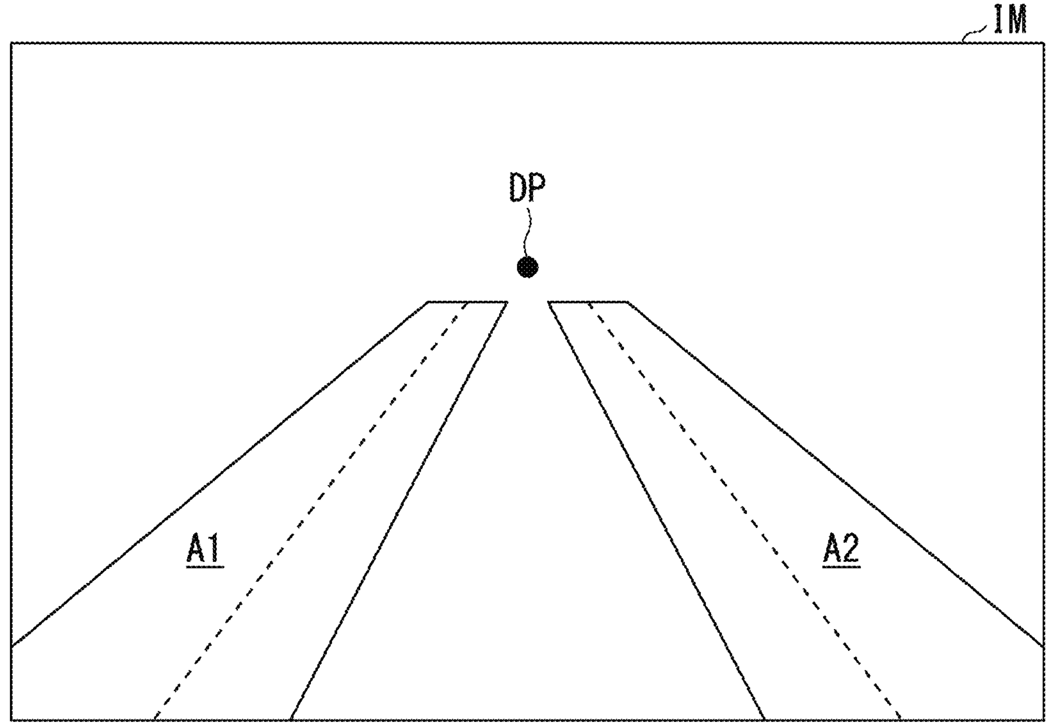
FIG. 4 is a diagram showing a range of positions of a series of edges that can be recognized as course boundary edges in the captured image.

FIG. 4 is a diagram showing a range of positions of a series of edges that can be recognized as course boundary edges in the captured image. The course boundary edges should be arranged from a lower portion of the captured image IM to a top dead point DP. Moreover, because the mobile object 1 is rarely moving directly above the course boundary, the course boundary edges should be arranged from a position offset to either the left or right toward the top dead point DP instead of being located at the center of the lower portion of the captured image IM. The road type recognition unit 120 recognizes edges arranged toward the top dead point DP in a region A1 shown in FIG. 4 as course boundary edges indicating the boundary between the virtual central lane Lm and the virtual left lane L1 and recognizes edges arranged toward the top dead point DP in a region A2 as course boundary edges indicating a boundary between the virtual central lane Lm and the virtual right lane Lr. In FIG. 4, a line recognized as the course boundary edges is a dotted line. In the example of FIG. 3, because a step 202 between the roadway 200 and the sidewalk 201 is extracted as the course boundary edge, the road type recognition unit 120 uses the course boundary edge as the boundary line between the virtual central lane Lm and the virtual left lane L1.

Figure 5:
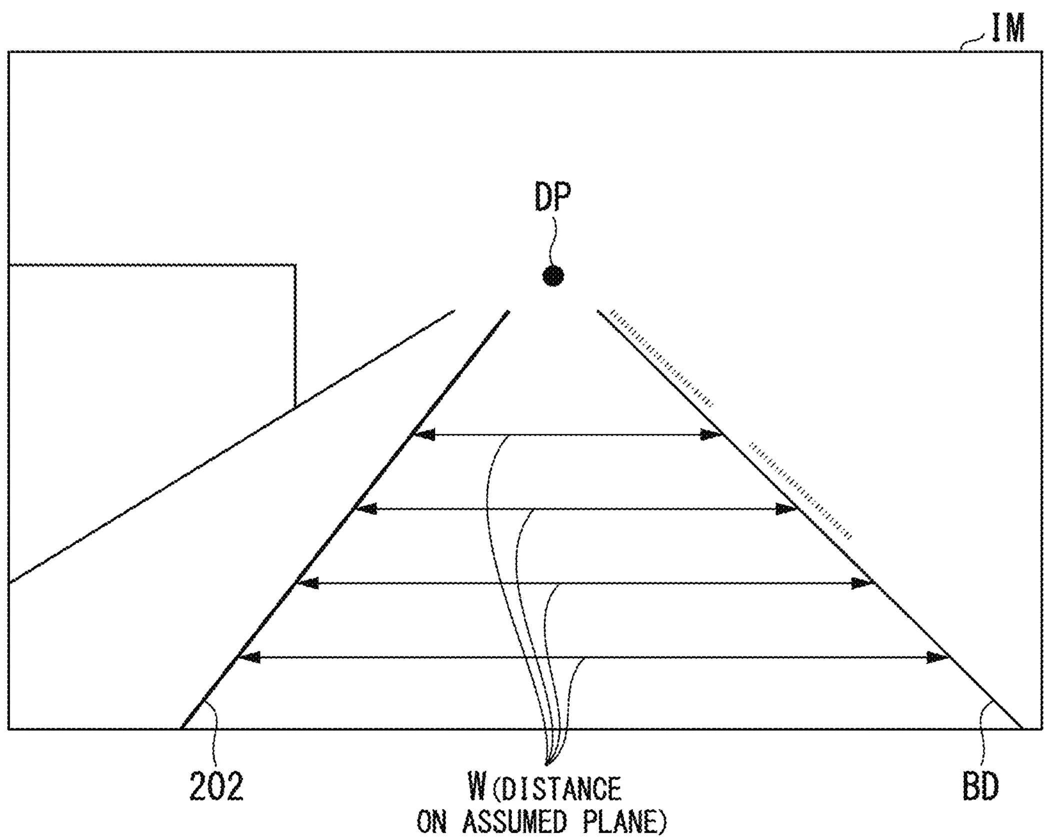
FIG. 5 is a diagram showing a state in which a boundary of a virtual lane is set by offsetting a specified width from an extracted course boundary edge.

When one of the course boundary edges that should be located on the left/right cannot be extracted, the road type recognition unit 120 designates a line offset by a specified width W (a width in an assumed plane seen from above) from the extracted course boundary edge to either the left or right as a boundary between two virtual lanes adjacent to each other. FIG. 5 is a diagram showing a state in which the boundary between the virtual lanes is set by offsetting the extracted course boundary edges by a specified width. In FIG. 5, BD denotes a set boundary between the virtual central lane Lm and the virtual right lane Lr. Because the specified width W is a width in an assumed plane S, the specified width W becomes narrower toward the upper side in the captured image IM. The specified width W is set to, for example, a width of a typical roadway, but may be variable in accordance with a result of recognizing whether the mobile object 1 is moving on the roadway or in the predetermined region. For example, if it is reliably recognized that the mobile object 1 is moving in the predetermined region (particularly on a sidewalk), at least the specified width W related to the virtual central lane Lm may be set to the width of a typical sidewalk.

When the edge line cannot be extracted at all, the road type recognition unit 120, for example, sets a line offset by a predetermined width (half of the specified width W) from the assumed course K to the left/right on the assumed plane, and designates a line on the plane of the captured image IM into which the set line is converted as a boundary between two virtual lanes adjacent to each other.

Thus, the road type recognition unit 120 sets a boundary between two virtual lanes adjacent to each other among the plurality of virtual lanes under the assumption that at least some of the plurality of virtual lanes are extended by a specified width on a road surface.

Moreover, the road type recognition unit 120 may perform an iterative process at a predetermined cycle and recognize whether the mobile object 1 is moving on the roadway or in the predetermined region by taking over previous recognition results for the plurality of virtual lanes.

The road type recognition unit 120 of the first embodiment recognizes whether the mobile object 1 is moving on the roadway or in the predetermined region on the basis of results of performing spatial classification processes on the basis of the output of the external environment detection device for the plurality of virtual lanes.

For example, the road type recognition unit 120 first recognizes whether the virtual central lane Lm is a representation of the roadway or the predetermined region. When a reliability degree of a recognition result related to the virtual central lane Lm is greater than or equal to a reference degree, the road type recognition unit 120 recognizes whether the mobile object 1 is moving on the roadway or in the predetermined region on the basis of the recognition result related to the virtual central lane Lm.

For example, the road type recognition unit 120 adds a point value to a roadway score Sr every time each of the plurality of first events indicating that the mobile object 1 is moving on the roadway in the region of the virtual central lane Lm of the captured image IM is recognized and recognizes that the mobile object 1 is moving on the roadway when the roadway score Sr is greater than or equal to a first threshold value Th1. At this time, the road type recognition unit 120 weights the point value in accordance with a confidence degree when each of the plurality of first events has been recognized and adds the weighted point value to the roadway score Sr. In this regard, when any one of a plurality of second events indicating that the mobile object 1 is moving on the sidewalk in the image captured by the external camera has been recognized, the road type recognition unit 120 recognizes that the mobile object 1 is moving on the sidewalk regardless of the roadway score Sr. The first events are an event in which there is no static obstacle such as a standing signboard, an event in which the vehicle is moving, an event in which there is a road surface marking, an event in which there is a crosswalk, and an event in which the vehicle is located on the lower side of the step. The second events are an event in which there is a static obstacle such as a standing signboard, an event in which there is a braille block, and an event in which the vehicle is located on the upper side of the step. In this case, a reliability degree of the recognition result related to the virtual central lane Lm is calculated on the basis of a value of the roadway score Sr. For example, the road type recognition unit 120 determines that the reliability degree of the recognition result related to the virtual central lane Lm is less than the reference degree when the roadway score Sr is less than the first threshold value Th1 and the second event is not recognized.

Alternatively, the road type recognition unit 120 may be configured to input the region of the virtual central lane Lm of the captured image IM to a first trained model, so that a result of recognizing whether the virtual central lane Lm, i.e., the region where the mobile object 1 is moving, is the roadway or the predetermined region is obtained. The first trained model is a model trained by machine learning so that information (an identification result) indicating whether a corresponding portion is a representation of the roadway or the predetermined region is output when an image having a size of the virtual central lane Lm is input. In this case, if the first trained model is set to output information indicating the reliability degree of the output information together with the identification result and the reliability degree output when the region of the virtual central lane Lm of the captured image IM is input to the first trained model is less than a reference value, it may be determined that the reliability degree of the recognition result related to the virtual central lane Lm is less than the reference degree.

Figure 6:
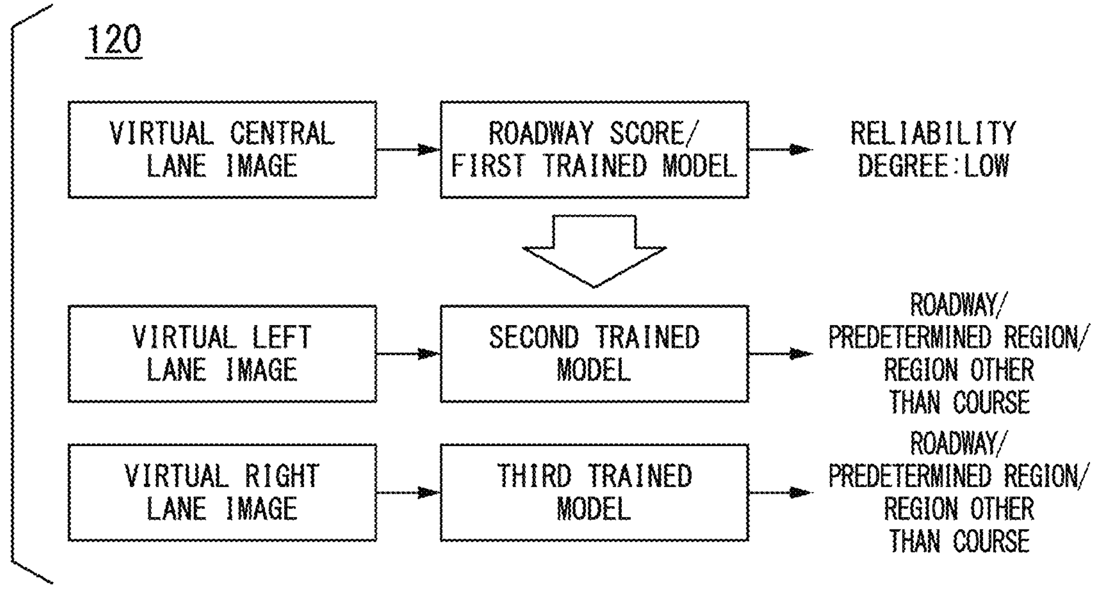
FIG. 6 is an explanatory diagram (Part 1) showing a process of a road type recognition unit 120.

When the reliability degree of the recognition result related to the virtual central lane Lm is less than the reference degree, the road type recognition unit 120 recognizes whether the mobile object 1 is moving on the roadway or in the predetermined region on the basis of results of performing spatial classification processes for the virtual left lane L1 and the virtual right lane Lr. As the spatial classification process, the road type recognition unit 120 recognizes whether each of the virtual left lane L1 and the virtual right lane Lr is a representation of the roadway, a representation of the predetermined region, a representation of a region other than the course (e.g., a wall of a building), or unclear. FIG. 6 is an explanatory diagram (Part 1) showing a process of the road type recognition unit 120. First, as described above, the road type recognition unit 120 performs a recognition process related to an image of the region of the virtual central lane Lm (hereinafter referred to as a virtual central lane image) and inputs an image of a region of the virtual left lane L1 (hereinafter referred to as a virtual left lane image) to a second trained model when the reliability degree is low, such that a recognition result indicating whether the virtual left lane L1 is a representation of the roadway, the predetermined region, or the region other than the course is obtained. Likewise, the road type recognition unit 120 inputs an image of a region of the virtual right lane Lr (hereinafter referred to as a virtual right lane image) to a third trained model, such that a recognition result indicating that the virtual right lane Lr is a representation of the roadway, the predetermined region, or the region other than the course is obtained. Each of the second and third trained models is a model trained by machine learning to output the above-described identification result when an image is input. That is, the model is a model in which an image is learned as learning data and a label indicating the roadway, the predetermined region, or the region other than the course is learned as training data.

The road type recognition unit 120 recognizes whether the mobile object 1 is moving on the roadway or in the predetermined region on the basis of a combination of results of performing spatial classification processes for the virtual left lane L1 and the virtual right lane Lm. More specifically, the road type recognition unit 120 recognizes whether the mobile object 1 is moving on the roadway or in the predetermined region on the basis of a combination of identification results related to the virtual left lane L1 and the virtual right lane Lr and an analysis result related to the virtual central lane Lm.

FIG. 7 is an explanatory diagram (Part 2) showing a process of the road type recognition unit 120. As indicated by (1) of FIG. 7, when it is recognized that both the virtual left lane L1 and the virtual right lane Lr are representations of the roadway, the road type recognition unit 120 recognizes that the virtual central lane Lm is a representation of the roadway, i.e., the mobile object 1 is moving on the roadway. Moreover, as shown in (2) of FIG. 7, when it is recognized that both the virtual left lane L1 and the virtual right lane Lr are representations of the predetermined region, the road type recognition unit 120 recognizes that the virtual central lane Lm is a representation of the predetermined region, i.e., the mobile object 1 is moving in the predetermined region.

As indicated by (3) to (5) of FIG. 7, when the road type recognition unit 120 recognizes that one of the virtual left lane L1 and the virtual right lane Lr is the roadway and the other is the representation of the predetermined region, it is recognized whether the mobile object 1 is moving on the roadway or in the predetermined region on the basis of a similarity degree al between the virtual left lane image and the virtual central lane image and a similarity degree αr between the virtual right lane image and the virtual central lane image. Although the virtual left lane L1 is the predetermined region and the virtual right lane Lr is the roadway in FIG. 7, it is only necessary to reverse the left and right sides in the opposite pattern. The similarity degree is an index value obtained by calculating a cosine similarity degree or the like for a feature quantity of each image calculated by a method using a convolution neural network (CNN) or the like, and can have, for example, a value from 0 to 1. In the following example, a second threshold value Th2 and a third threshold value Th3 are both positive values and Th2>Th3.

As indicated by (3) of FIG. 7, when the similarity degree αl is greater than the second threshold value Th2 and a difference αl−αr obtained by subtracting the similarity degree αr from the similarity degree αl is greater than the third threshold value Th3, the road type recognition unit 120 recognizes that the virtual central lane Lm is a representation of the predetermined region, i.e., the mobile object 1 is moving in the predetermined region.

As indicated by (4) of FIG. 7, when the similarity degree αr is greater than the second threshold value Th2 and a difference αr-αl obtained by subtracting the similarity degree αl from the similarity degree αr is greater than the third threshold value Th3, the road type recognition unit 120 recognizes that the virtual central lane Lm is a representation of the roadway, i.e., the mobile object 1 is moving on the roadway.

As indicated by (5) of FIG. 7, when both the similarity degree αr and the similarity degree αl are less than or equal to a fourth threshold value Th4, the road type recognition unit 120 outputs a recognition result indicating that it is unclear whether the virtual central lane Lm is a representation of the roadway or the predetermined region, i.e., it is unclear whether the mobile object 1 is moving on the roadway or in the predetermined region.

As indicated by (6) to (8) of FIG. 7, when it is recognized that one of the virtual left lane L1 and the virtual right lane Lr is located outside the course and the other is a representation of the roadway, the road type recognition unit 120 recognizes whether the mobile object 1 is moving on the roadway or in the predetermined region on the basis of a similarity degree αl between the virtual left lane image and the virtual central lane image, a similarity degree αr between the virtual right lane image and the virtual central lane image, and whether or not there is a partition such as a guardrail in a boundary portion between the virtual central lane image and an image recognized as the representation of the roadway. Although the virtual left lane L1 is located outside the course and the virtual right lane Lr is the roadway in FIG. 7, it is only necessary to reverse the left and right sides in the opposite pattern.

First, as shown in (6) of FIG. 7, when there is a partition such as a guardrail in a boundary portion between the virtual central lane image and the virtual right lane image, the road type recognition unit 120 recognizes that the virtual central lane Lm is a representation of the predetermined region, i.e., the mobile object 1 is moving in the predetermined region.

As indicated by (7) of FIG. 7, when there is no partition such as a guardrail in a boundary portion between the virtual central lane image and the virtual right lane image and the similarity degree αr between the virtual central lane image and the virtual right lane image is less than or equal to the fourth threshold value Th4, the road type recognition unit 120 recognizes that the virtual central lane Lm is a representation of the predetermined region, i.e., the mobile object 1 is moving in the predetermined region.

As indicated by (8) of FIG. 7, when there is no partition such as a guardrail in a boundary portion between the virtual central lane image and the virtual right lane image and the similarity degree αr between the virtual central lane image and the virtual right lane image is greater than the fourth threshold value Th4, the road type recognition unit 120 recognizes that the virtual central lane Lm is a representation of the roadway, i.e., the mobile object 1 is moving on the roadway.

According to the first embodiment described above, it is possible to recognize whether the mobile object 1 is moving on the roadway or in the predetermined region different from the roadway by reflecting a feature of each virtual lane. Even in a case where it is difficult to make the determination only from the virtual central lane image, the recognition accuracy can be improved by referring to the virtual left lane image and the virtual right lane image. As a result, it is possible to appropriately recognize whether the mobile object 1 is moving on the roadway or in the predetermined region different from the roadway.

Second Embodiment

Hereinafter, a second embodiment will be described. In a control device 100 of the second embodiment, a road type recognition unit 120 uses an integrated trained model including a virtual lane setting layer to recognize whether a mobile object 1 is moving on a roadway or in a predetermined region different from the roadway.

FIG. 8 is an explanatory diagram showing details of a process of a road type recognition unit 120 using the integrated trained model. The road type recognition unit 120 obtains a result of recognizing whether the mobile object 1 is moving on the roadway or in the predetermined region by inputting a captured image IM to the integrated trained model. The integrated trained model includes, for example, a virtual lane setting layer, a virtual central lane recognition layer, a virtual left lane recognition layer, a virtual right lane recognition layer, and a recognition result integration layer. The integrated trained model is based on a machine learning model in which a connection structure as shown in FIG. 8 is defined and is trained by a method to be described below.

When the captured image IM is input, the virtual lane setting layer outputs a range of a virtual central lane Lm, a virtual left lane L1, and a virtual right lane Lr in the captured image IM. The virtual central lane recognition layer functions as in the first trained model in the first embodiment, the virtual left lane recognition layer functions as in the second trained model in the first embodiment, and the virtual right lane recognition layer functions as in the third trained model in the first embodiment. Although the recognition result integration layer has a function corresponding to the process shown in FIG. 7 in the first embodiment, the recognition result integration layer is not limited to a function according to a specified rule exemplified in FIG. 7 and is configured to perform a calculation process corresponding to a result of machine learning.

Figure 9:
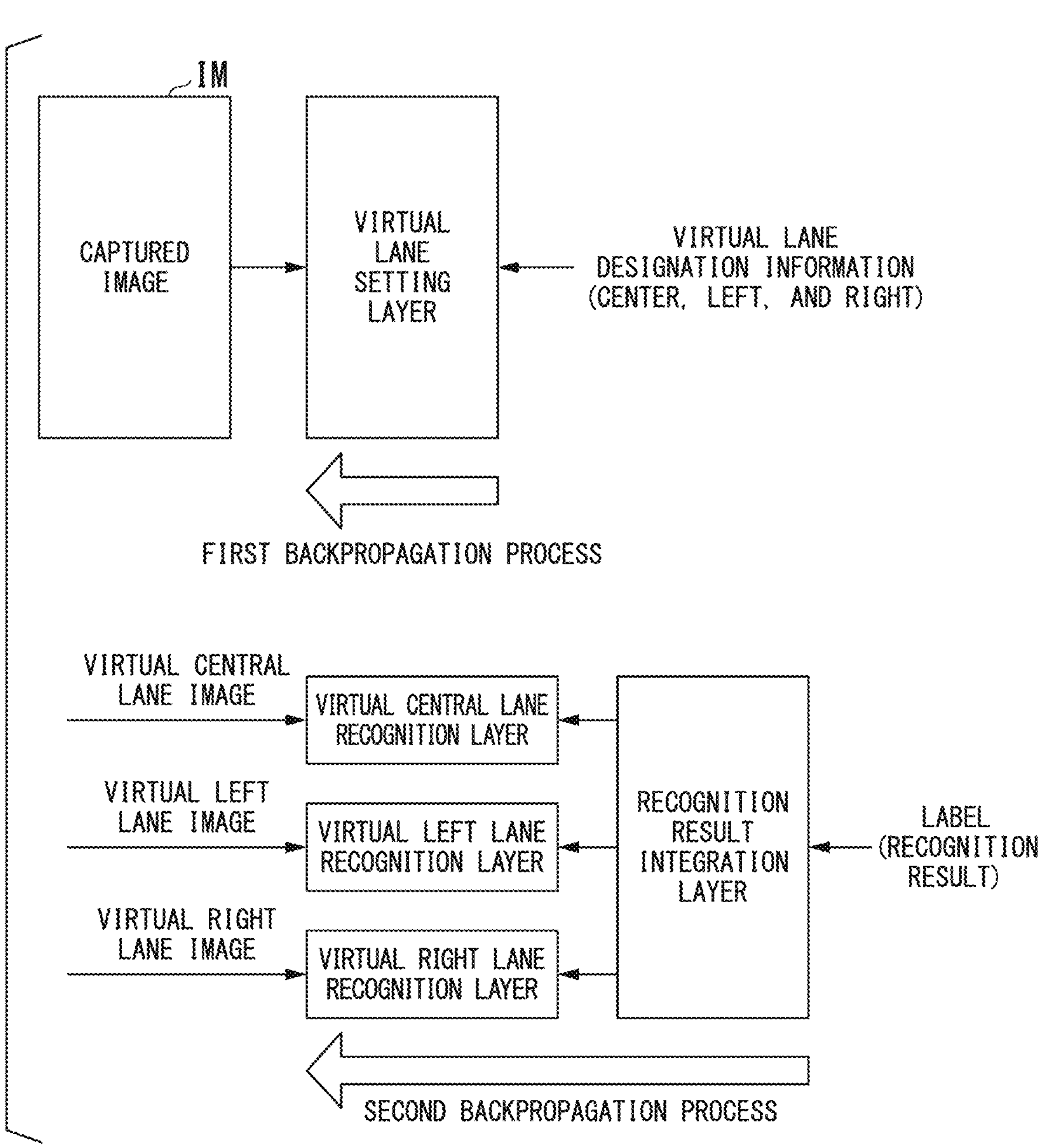
FIG. 9 is an explanatory diagram showing a learning process of the integrated trained model.

FIG. 9 is an explanatory diagram showing a learning process of the integrated trained model. The integrated trained model is generated by a learning device (not shown). In the virtual lane setting layer, parameters are learned in a first backpropagation process using the captured image IM as learning data and virtual lane designation information indicating which region corresponds to which virtual lane in the captured image IM as training data. The virtual central lane recognition layer, the virtual left lane recognition layer, the virtual right lane recognition layer, and the recognition result integration layer are trained collectively by, for example, a second backpropagation process. For example, when a virtual central lane image input to the virtual central lane recognition layer, a virtual left lane image input to the virtual left lane recognition layer, and a virtual right lane image input to the virtual right lane recognition layer are used as learning data, and a label (a recognition result) indicating either a roadway or a predetermined region is used as training data, the parameters of the virtual central lane recognition layer, the virtual left lane recognition layer, the virtual right lane recognition layer, and the recognition result integration layer are learned by the second backpropagation process. Thus, in the integrated trained model, a parameter of a layer for performing a spatial classification process for each virtual lane and a parameter of a layer for integrating results of spatial classification processes for virtual lanes are learned at once in the second backpropagation process using common learning data and training data.

By training the integrated trained model in this way, it is possible to recognize whether the mobile object 1 is moving on the roadway or in the predetermined region different from the roadway by reflecting a feature of each virtual lane. Even in cases where it is difficult to make the determination only from the virtual central lane image, the recognition accuracy can be improved by referring to the virtual left lane image and the virtual right lane image. Moreover, because recognition can be performed with features not assumed by a creator of a rule-based system using machine learning, there is a possibility that recognition accuracy can be further improved. As a result, according to the second embodiment, it is possible to appropriately recognize whether the mobile object 1 is moving on the roadway or in the predetermined region different from the roadway.

Modified Example of Second Embodiment

Figure 10:
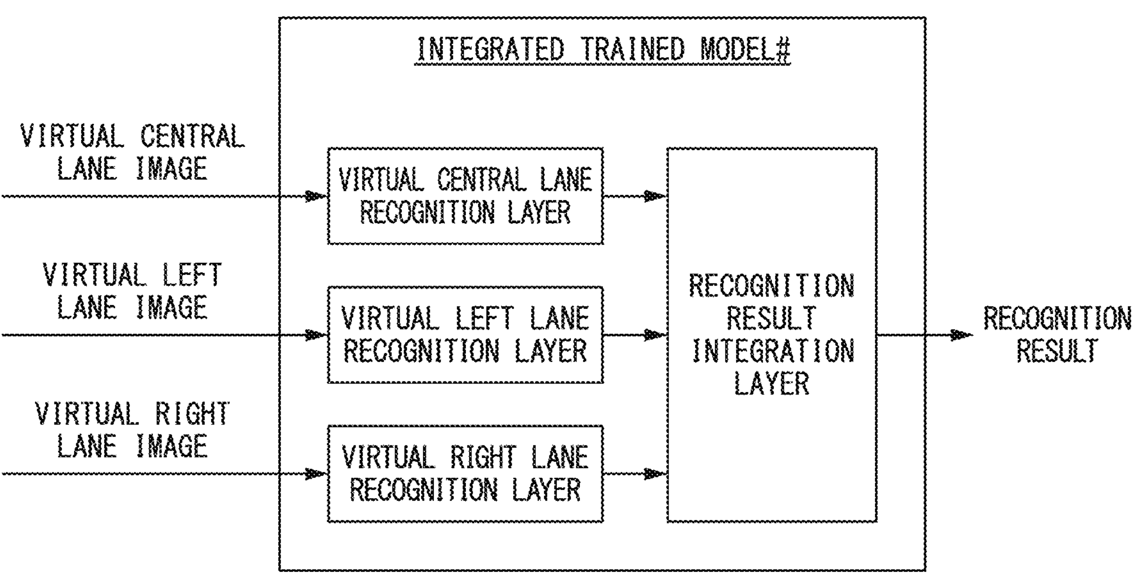
FIG. 10 is a diagram showing a process of a modified example of a second embodiment.

In the second embodiment, recognition results may be obtained by inputting the virtual central lane image, the virtual right lane image, and the virtual left lane image cut out from the captured image IM on the basis of the information of the virtual lane set on the basis of a rule as in the first embodiment to an integrated trained model # (in which the virtual lane setting layer is excluded from the layers shown in FIG. 8) instead of inputting the captured image IM to the integrated trained model. FIG. 10 is a diagram showing a process of a modified example of the second embodiment. In the integrated trained model #, the parameters have been learned by the above-described second backpropagation process. That is, in the integrated trained model #, a parameter of the layer for performing a spatial classification process for each virtual lane and a parameter of the layer for integrating results of spatial classification processes for virtual lanes are learned at once in the second backpropagation process using common learning data and training data.

The embodiment described above can be represented as follows.

A mobile object control device including:

a storage medium storing computer-readable instructions; and a processor connected to the storage medium, the processor executing the computer-readable instructions to:

set a virtual central lane including an assumed course of a mobile object capable of moving both on a roadway and in a predetermined region different from the roadway, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object;

recognize whether the mobile object is moving on the roadway or in the predetermined region on the basis of results of performing spatial classification processes for the virtual central lane, the virtual right lane, and the virtual left lane; and limit a speed of a case where the mobile object moves on the roadway to a first speed and limit a speed of a case where the mobile object moves in the predetermined region to a second speed lower than the first speed.

Although modes for carrying out the present invention have been described above using embodiments, the present invention is not limited to the embodiments and various modifications and substitutions can also be made without departing from the scope and spirit of the present invention.

REFERENCE SIGNS LIST

10 External environment detection device
12 Mobile object sensor
14 Manipulation element
16 Internal camera
18 Positioning device
22 Mode changeover switch
30 Moving mechanism
40 Drive device
50 External notification device
70 Storage device
100 Control device
120 Road type recognition unit
130 Physical object recognition unit
140 Control unit

The invention claimed is:

1. A mobile object control device for controlling a mobile object capable of moving both on a roadway and in a predetermined region different from the roadway, the mobile object control device comprising:

a processor configured to:

control at least a speed of the mobile object;

set a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object;

perform spatial classification processes on a region of the image corresponding to the virtual central lane, a region of the image corresponding to the virtual right lane, and a region of the image corresponding to the virtual left lane;

recognize whether the mobile object is moving on the roadway or in the predetermined region on the basis of a result of the spatial classification processes for the virtual central lane when a reliability degree of the result of the spatial classification processes related to the virtual central lane is greater than or equal to a reference degree; and recognize whether the mobile object is moving on the roadway or in the predetermined region on the basis of a combination of a result of the spatial classification processes for the virtual right lane and a result of the spatial classification processes for the virtual left lane when the reliability degree of the result of the spatial classification processes related to the virtual central lane is less than the reference degree;

limit a speed of a case where the mobile object moves on the roadway to a first speed; and limit a speed of a case where the mobile object moves in the predetermined region to a second speed lower than the first speed.

2. The mobile object control device according to claim 1, wherein the processor is configured to recognize whether each of the virtual left lane and the virtual right lane is a representation of the roadway, the predetermined region, or a region other than the course as the spatial classification process.

3. The mobile object control device according to claim 2, wherein the processor is configured to recognize whether the mobile object is moving on the roadway or in the predetermined region on the basis of a similarity degree between an image related to the virtual left lane and an image related to the virtual central lane and a similarity degree between an image related to the virtual right lane and the image related to the virtual central lane when recognizing that one of the virtual left lane and the virtual right lane is the representation of the roadway and the other of the virtual left lane and the virtual right lane is the representation of the predetermined region.

4. The mobile object control device according to claim 2, wherein the processor is configured to recognize whether the mobile object is moving on the roadway or in the predetermined region on the basis of a similarity degree between an image related to the virtual left lane and an image related to the virtual central lane, a similarity degree between an image related to the virtual right lane and the image related to the virtual central lane, and whether or not there is a partition in a boundary portion between the image related to the virtual central lane and an image recognized as the representation of the roadway when recognizing that one of the virtual left lane and the virtual right lane is the representation of the region other than the course and the other of the virtual left lane and the virtual right lane is the representation of the roadway.

5. The mobile object control device according to claim 1, wherein the processor is configured to obtain a result of recognizing whether the mobile object is moving on the roadway or in the predetermined region by inputting information, which is obtained by adding virtual lane designation information indicating which region corresponds to which virtual lane to the captured image, to a trained model.

6. The mobile object control device according to claim 5, wherein the trained model is a trained model in which a parameter of a layer for performing a spatial classification process for each virtual lane and a parameter of a layer for integrating results of spatial classification processes for virtual lanes are simultaneously learned in a backpropagation process using common learning data and training data.

7. The mobile object control device according to claim 1, wherein the processor is configured to obtain a result of recognizing whether the mobile object is moving on the roadway or in the predetermined region by inputting the captured image to a trained model.

8. The mobile object control device according to claim 1, wherein the processor is configured to designate a series of edges as a boundary between two virtual lanes adjacent to each other among a plurality of virtual lanes when the series of edges indicating a course boundary in the captured image can be extracted.

9. The mobile object control device according to claim 8, wherein the processor is configured to set a boundary between two virtual lanes adjacent to each other among a plurality of virtual lanes by assuming that at least some of the plurality of virtual lanes are extended by a specified width on a road surface with respect to a region where the series of edges cannot be extracted in the captured image.

10. The mobile object control device according to claim 1, wherein the processor is configured to perform an iterative process at a predetermined cycle and recognize whether the mobile object is moving on the roadway or in the predetermined region by taking over previous recognition results for a plurality of virtual lanes.

11. A mobile object control method to be performed by a mobile object control device for controlling a mobile object capable of moving both on a roadway and in a predetermined region different from the roadway, the mobile object control method including:

controlling at least a speed of the mobile object;

setting a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object;

performing spatial classification processes on a region of the image corresponding to the virtual central lane, a region of the image corresponding to the virtual right lane, and a region of the image corresponding to the virtual left lane;

recognizing whether the mobile object is moving on the roadway or in the predetermined region on the basis of a result of the spatial classification processes for the virtual central lane when a reliability degree of the result of the spatial classification processes related to the virtual central lane is greater than or equal to a reference degree;

recognizing whether the mobile object is moving on the roadway or in the predetermined region on the basis of a combination of a result of the spatial classification processes for the virtual right lane and a result of the spatial classification processes for the virtual left lane when the reliability degree of the result of the spatial classification processes related to the virtual central lane is less than the reference degree;

limiting a speed of a case where the mobile object moves on the roadway to a first speed; and limiting a speed of a case where the mobile object moves in the predetermined region to a second speed lower than the first speed.

12. A non-transitory storage medium storing a program for causing a processor of a mobile object control device for controlling a mobile object capable of moving both on a roadway and in a predetermined region different from the roadway to:

control at least a speed of the mobile object;

set a virtual central lane including an assumed course of the mobile object, a virtual right lane located on a right side of the virtual central lane as seen from the mobile object, and a virtual left lane located on a left side of the virtual central lane as seen from the mobile object in an image captured by an external camera configured to perform an imaging process in a movement direction of the mobile object;

perform spatial classification processes on a region of the image corresponding to the virtual central lane, a region of the image corresponding to the virtual right lane, and a region of the image corresponding to the virtual left lane;

recognize whether the mobile object is moving on the roadway or in the predetermined region on the basis of a result of the spatial classification processes for the virtual central lane when a reliability degree of the result of the spatial classification processes related to the virtual central lane is greater than or equal to a reference degree;

recognize whether the mobile object is moving on the roadway or in the predetermined region on the basis of a combination of a result of the spatial classification processes for the virtual right lane and a result of the spatial classification processes for the virtual left lane when the reliability degree of the result of the spatial classification processes related to the virtual central lane is less than the reference degree;

limit a speed of a case where the mobile object moves on the roadway to a first speed; and limit a speed of a case where the mobile object moves in the predetermined region to a second speed lower than the first speed.

* * * * *